(12) United States Patent
Sherman et al.

(10) Patent No.: US 8,144,585 B2
(45) Date of Patent: Mar. 27, 2012

(54) DATA PROCESSING DEVICE INTERFACE AND METHODS THEREOF

(75) Inventors: Arthur A Sherman, Maynard, MA (US); Jonathan M Owen, Northborough, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 515 days.

(21) Appl. No.: 12/174,019

(22) Filed: Jul. 16, 2008

(65) Prior Publication Data

US 2010/0014535 A1   Jan. 21, 2010

(51) Int. Cl.
  G01R 31/08  (2006.01)
  G06F 11/00  (2006.01)
  G08C 15/00  (2006.01)
  H04J 1/16   (2006.01)
  H04J 3/14   (2006.01)
  H04L 1/00   (2006.01)
  H04L 12/26  (2006.01)
  H04L 12/28  (2006.01)
  H04L 12/56  (2006.01)

(52) U.S. Cl. .................. 370/233; 370/234; 370/236.1; 370/395.21; 370/395.42; 370/401; 370/410; 370/412; 370/426; 709/225; 709/226; 709/228; 709/229; 709/231; 709/233; 709/234; 709/235

(58) Field of Classification Search ............... None
See application file for complete search history.

(56) References Cited

U.S. PATENT DOCUMENTS

| | | | |
|---|---|---|---|
| 5,844,887 A * | 12/1998 | Oren et al. ............ | 370/218 |
| 6,647,443 B1 * | 11/2003 | Schultz et al. ......... | 710/52 |
| 6,707,824 B1 * | 3/2004 | Achilles et al. ......... | 370/412 |
| 2008/0184259 A1 * | 7/2008 | Lesartre et al. ......... | 719/312 |

* cited by examiner

*Primary Examiner* — Nishant Divecha

(57) ABSTRACT

A method of receiving communications at a data processing device includes receiving a packet from a virtual channel associated with a physical communication link. The packet is associated with a link virtual channel, and is stored in a storage location with the link virtual channel. Multiple internal virtual channels can be associated with the link virtual channel. A pointer to the storage location is enqueued in one of a plurality of FIFOs associated with one of the internal virtual channels. Each FIFO of the plurality of FIFOs stores pointers associated with a different internal virtual channel, allowing receiver arbitration logic to reorder between internal virtual channels based on internal resource availability and current priorities among virtual channels. This reduces the likelihood of communication deadlock and supports multiple classes of service.

13 Claims, 4 Drawing Sheets

| ACTION | FIFO1 SPACE | FIFO2 SPACE | BUFFER SPACE | AVAILABLE CREDITS | |
|---|---|---|---|---|---|
| RESET | 5 | 2 | 5 | 0 | ← 220 |
| ISSUE INITIAL CREDIT RELEASES | 5 | 2 | 5 | 2 | ← 221 |
| RECEIVE LP PACKET | 4 | 2 | 4 | 1 | ← 222 |
| ISSUE CREDIT RELEASE | 4 | 2 | 4 | 2 | ← 223 |
| RECEIVE LP PACKET | 3 | 2 | 3 | 1 | ← 224 |
| ISSUE CREDIT RELEASE | 3 | 2 | 3 | 2 | ← 225 |
| PROVIDE LP PACKET | 4 | 2 | 4 | 2 | ← 226 |
| RECEIVE HP PACKET | 4 | 1 | 3 | 1 | ← 228 |
| RECEIVE HP PACKET | 4 | 0 | 2 | 0 | ← 230 |
| PROVIDE HP PACKET | 4 | 1 | 3 | 0 | ← 232 |
| ISSUE CREDIT RELEASE | 4 | 1 | 3 | 1 | ← 233 |

FIG. 2

DATA PROCESSING DEVICE INTERFACE AND METHODS THEREOF

FIELD OF THE DISCLOSURE

The present disclosure relates to data processing devices and more particularly to device interfaces for data processing devices.

BACKGROUND

A data processing device can communicate with another device via a physical communication link. To provide varying service levels for different communications and to avoid deadlock and other communication errors, the data processing device can associate the physical communication link with a number of virtual channels, and communicate packets via the virtual channels. Packets in different virtual channels may be reordered, and separate resources are allocated to the various virtual channels to prevent them from blocking each other. Flow control information is sent across the communications link to indicate the status of these resources to the other communicating device, allowing the other device to manage in which channels packets are sent.

In some cases, it is desirable for a data processing device to be able to support more virtual channels internally than are provided on the physical communications link. This allows more flexibility in packet reordering, and handling of priorities among more types of traffic than the physical communications link may recognize. Additional virtual channels can be supported by mapping a single link virtual channel to multiple internal virtual channels, based on the contents of the packets. Flow control information is typically sent on a link virtual channel basis, so the internal virtual channels are invisible at the link level. In order to reduce the likelihood of communication blockage between the virtual channels, it is desirable that, support for the mapping exist in both the transmitting and receiving device. Accordingly, the receiving device can support mapping by providing resources to the internal virtual channels that map from the single link virtual channel. In some devices, the full amount of communication resources associated with the link virtual channel are allocated to each single virtual channel. While this reduces the likelihood of an overflow, as each internal virtual channel can sink all the packets associated with the link virtual channel, it can be inefficient, as the total number of packets received cannot exceed the resources allotted to a single virtual channel.

BRIEF DESCRIPTION OF THE DRAWINGS

FIG. 2 is a diagram of a particular embodiment of a table representing a flow control scheme for the data processing device of FIG. 1;

DETAILED DESCRIPTION

A method of receiving communications at a data processing device includes receiving a packet from a virtual channel associated with a physical communication link. The packet is associated with a link virtual channel, and is stored in a storage location associated with the link virtual channel. Multiple internal virtual channels can be associated with the link virtual channel. A pointer to the storage location is enqueued in one of a plurality of FIFOs associated with one of the internal virtual channels. Each FIFO of the plurality of FIFOs stores pointers associated with a different internal virtual channel, allowing receiver arbitration logic to reorder between internal virtual channels based on internal resource availability and current priorities among virtual channels. This reduces the likelihood of communication deadlock and supports multiple classes of service, and also maintains ordering within each internal virtual channel.

Figure 1:
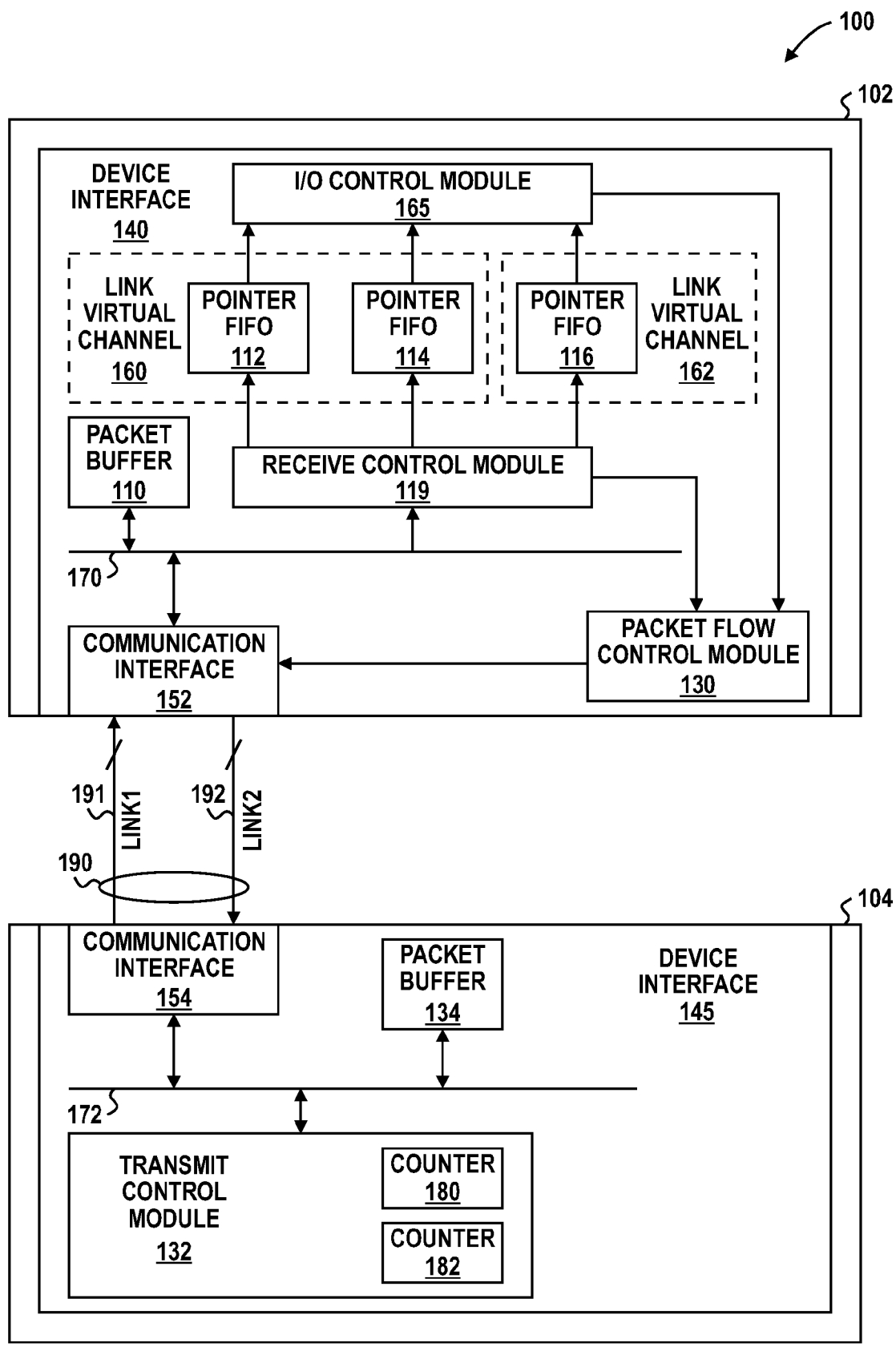
FIG. 1 is a block diagram of a particular embodiment of a data processing device in accordance with one embodiment of the present disclosure.

Referring to FIG. 1, a block diagram of a particular embodiment of a data processing system 100 is illustrated. The data processing system 100 includes a data processing device 102 and a data processing device 104. In the illustrated embodiment of FIG. 1, the data processing device 102 is a processor, such as a general purpose microprocessor or application specific integrated circuit (ASIC) that can execute instructions at a processor core (not shown) or otherwise manipulate received data. The data processing device 104 can be a peripheral device for the data processing device 102, such as a graphics processor, a memory controller, an input/output controller, and the like.

The data processing devices 102 and 104 are connected via a bidirectional bus 190 that can be implemented using separate unidirectional busses 191 and 192, labeled "LINK1" and "LINK2" respectively. The LINK1 and LINK2 busses provide a physical medium for communications between the data processing devices 102 and 104. In particular, the LINK1 bus provides a physical link for communications from the data processing device 104 to the data processing device 102, while the LINK2 bus provides the medium for communications in the opposite direction. Each of the LINK1 and LINK2 busses can be multiple bits wide. The bit width of communications on the LINK1 and LINK2 busses are individually scalable, and can be set to different widths depending on the specified architecture of the data processing system 100. Further, the LINK1 and LINK2 busses can include bit lines dedicated to communicating control information and bit lines dedicated to communicating data. The LINK1 and LINK2 busses are configured to communicate packets targeted for functional modules (not shown) at the data processing devices 102 and 104 other than the device interfaces 140 and 145. These packets are referred to herein as transaction layer packets. In addition, the LINK1 and LINK2 busses are configured to communicate packets targeted to either of the device interfaces 140 and 145, such as flow control packets.

The data processing devices 102 and 104 can divide the physical communications link represented by the LINK1 and LINK2 busses into a number of link virtual channels. As used herein, a link virtual channel is a virtual channel associated with a specified physical communications link. As used herein, an internal virtual channel refers to a virtual channel internal to a device, whose transaction layer packets are mapped into a particular link channel (perhaps along with those of other internal virtual channels) for transmission across the link. For example, each transaction layer packet between the data processing devices 102 and 104 can be associated with a particular link virtual channel, and each link virtual channel can be associated with one or more internal virtual channels. In particular, communications between the data processing devices 102 and 104 are packet based with each transaction layer packet having a header identifying the link virtual channel associated with a specific packet to facilitate processing of the packet at the destination device. Internal virtual channels can be associated with different types of data, classes of service, and the like, whereby the data type is also decoded from the packet header. Flow control packets are associated with each link virtual channel, and are used to signal the ability of the receiver to accept transaction layer packets in that link virtual channel.

The data processing device 104 includes a device interface module 145, which provides an interface layer for communications between the data processing device 104 and the LINK1 and LINK2 busses. In particular, the device interface module 145 is configured to receive transaction layer information to be communicated from other modules (not shown) of the data processing device 104, and to encode and transmit the information as packets on the LINK1 bus. In addition, the device interface module 145 is further configured to receive transaction layer packets from the LINK2 bus and provide those packets to other modules of the data processing device 104.

The device interface module 140 includes a bus 170, and a communications interface 152, a packet buffer 110, a receive control module 119, a packet flow control module 130, an input/output (I/O) control module 165, and pointer first-in-first-out (FIFO) queues 112, 114, and 116. The bus 170 includes a bi-directional connections to communication interface 152 and to packet buffer 110 and a uni-directional connection to receive control module 119. The pointer FIFOs 112, 114, and 116 each include an output connected to a corresponding input of the I/O control module 165, and each include an input connected to a corresponding output of the receive control module 119. The I/O control module 165 includes an output connected to an input of the packet flow control module 130. In addition, the receive control module includes an output connected to an input of the packet flow control module 130. The packet flow control module 130 includes an output connected to an input of the communication interface 152. In the illustrated embodiment, each of the pointer FIFOs 112, 114, and 116 are associated with a particular link virtual channel of the LINK1 bus. In the illustrated embodiment of FIG. 1, the pointer FIFOs 112 and 114 are associated with a link virtual channel 160, while the pointer FIFO 116 is associated with link virtual channel 162. In addition, the pointer FIFOs 112 and 114 are each associated with a different internal virtual channel of the link virtual channel 160.

The device interface 140 is configured to store transaction layer packets received via the LINK1 bus in the packet buffer 110. Space in the packet buffer 110 is divided among the link virtual channels, such that each link virtual channel can store a designated number of packets. To differentiate stored packets among the link and internal virtual channels, the device interface 140 stores pointers to memory locations of the packet buffer 110 in one of the pointer FIFOs 112, 114, and 116. In particular, each pointer is stored in a pointer FIFO associated with the link virtual channel of the packet stored at the location indicated by the pointer. Further, for the virtual channel 160, the device interface 140 differentiates between stored packets based on the internal virtual channel of a stored packet by storing a pointer to the memory location of the packet in one of the pointer FIFOs 112 and 114. For the virtual channel 162, only one FIFO is associated with the virtual channel, indicating that virtual channel 162 is associated with a single internal virtual channel of the data interface 140.

To illustrate, the communication interface 152 provides a physical communication layer to receive and transmit packets via the LINK1 and LINK2 busses, respectively. Accordingly, the communication interface 152 is configured to receive transaction layer packets from the LINK1 bus and provide those packets to the bus 170. The receive control module 119 decodes and stores a received transaction layer packet at a memory location of the packet buffer 110. Further, the receive control module 119 decodes the virtual channel information included in the received packet and, based on the link virtual channel and internal virtual channel represented by the packet header, stores a pointer to the memory location where the packet is stored in one of the FIFOs 112, 114, and 116. For example, if a received transaction layer packet is associated with the link virtual channel 162, the receive control module 119 stores the packet at a memory location of the packet buffer 110 and the receive control module 119 stores a pointer to the memory location at the pointer FIFO 116. In addition to the buffer pointer, FIFO entries of the FIFOs 112, 114, and 116 can include other information about the packet such as destination, priority, resource requirements, or ordering requirements with respect to other virtual channels.

If a received packet is associated with the link virtual channel 160, the receive control module 119 determines the internal virtual channel associated with the packet represented by the packet, and selects one of the pointer FIFOs 112 and 114 based on the internal virtual channel associated with the packet. In an embodiment, the internal virtual channels can be assigned based on types of data, so that each of the FIFOs 112 and 114 store pointers associated with the data type. For example, the FIFO 112 can store pointers associated with requests for video data while the FIFO 114 is associated with stored requests for non-video data. In another embodiment, the internal virtual channels can be assigned based on classes of service.

The I/O control module 165 analyzes the head entries of the pointer FIFOs 112, 114, and 116 to determine which internal virtual channels have packets to send and to determine information about the packets associated with each head pointer. The I/O control module 165 arbitrates among the packets at the head of each non-empty FIFO, taking into account this information, as well as information from the modules beyond the device interface about resource availability and device-wide priorities. It chooses one internal virtual channel to be serviced, pops the head of the pointer FIFO associated with the internal virtual channel, reads the packet pointed to out of the packet buffer, and sends it to its destination module.

The operation of the data processing device 102 may be better understood by reference to an example operation. In the example, a transaction layer packet is received via the LINK1 bus at the communication interface 152. The communication interface 152 provides the packet to receive control module 119, which decodes the packet and stores the packet at the packet buffer 110. The receive control module 119 determines the packet is associated with the link virtual channel 160 and further determines that the received packet is associated with a specific type of data or class of service based upon header or payload information of the packet, or based upon a value stored at a register. Based on this determination the receive control module 119 identifies that the pointer associated with the packet should be stored at the pointer FIFO 114. For purposes of this example, it is assumed that the specific type of data is requests for video data. The channel decode module generates the pointer, and provides the pointer to the pointer FIFO 114. The packet buffer 110 stores the packet at the memory location indicated by the pointer, and the pointer FIFO 114 stores the pointer in the queue.

When the pointer reaches the head of FIFO 112, the I/O control module 165 compares it to the information queued at the heads of the other FIFOs (FIFO 112 and FIFO 116). If the destination of the video request is able to receive it, all ordering dependencies are resolved, and the priority of video requests is currently higher than that of any other enqueued traffic, the I/O control module 165 will dereference the video request packet out of the packet buffer 110 using the pointer from the FIFO 114, and send it to its destination.

The device interface 140 employs the packet flow control module 130 to control the communication of packets from the data processing device 104 so that the packet buffer 110 and the FIFOs 112, 114, and 116 do not overflow. In particular, the packet flow control module 130 determines the amount of available space at the packet buffer 110 and the pointer FIFOs 112, 114, and 116 to determine the amount of space available to receive packets for each link virtual channel. The packet flow control 130 provides indicators so that the data processing device 104 can keep track of the amount of available space for each link virtual channel, and communicate packets for a particular link virtual channel only when space is available.

The data processing device 104 keeps track of available space at the device interface 140 on a per-link virtual channel basis. Accordingly, to prevent overflow for the link virtual channel 160, the device interface 140 cannot receive packets on the link virtual channel 160 when any one of the pointer FIFO 112, the pointer FIFO 114, and the buffer 118 is full. Thus, for the link virtual channel 160, the packet flow control module 130 can determine the amount of available space for the channel based on the minimum of the amount of space available at the pointer FIFO 112, the pointer FIFO 114, and in the channel's allocation in the packet buffer 110. This ensures that if one of the pointer FIFO 112, the pointer FIFO 114, and the packet buffer 110 is full, no more packets associated with the virtual channel 160 are received until space becomes available.

The device interface 145 manages transmission of packets to the device interface 140 based on the availability indicators provided by the flow control module 130. To illustrate, the device interface 145 includes a bus 172. The device interface 145 also includes a communication interface 154, a transmit control module 132, and a packet buffer 134, each connected to the bus 172. The transmit control module 132 includes a counter 180 and a counter 182.

The communication interface 154 provides a physical communication layer to receive and transmit packets via the bus 190. Accordingly, the communication interface 154 is configured to receive packets from the bus 172 and provide them to the LINK1 bus. The communication interface 154 is also configured to receive packets via the LINK2 bus and communicate those packets over the bus 172. The packet buffer 134 is a memory, such as a RAM memory, configured to store packets representing information received from other modules (not shown) of the data processing device 104. The packet buffer 134 is further configured to provide packets associated with particular link virtual channels for transmission via the communication interface 154 in response to control information received via the bus 172.

The transmit control module 132 is configured to determine the number of packets that can be transmitted over a specific link virtual channel to the data processing device 102. In particular, each of the counters 180 and 182 is associated with a different link virtual channel. In the illustrated example of FIG. 1, the counter 180 is associated with the virtual channel 160 and the counter 182 is associated with the virtual channel 162. The counters 180 and 182 store values indicative of the number of packets that can be received at the data processing device 102. If the values stored at the counter 180 or the counter 182 indicate that sufficient space is available, the transmit control module 132 accesses the packet buffer 134 to retrieve a packet associated with the appropriate virtual channel and transmits the received packet to the data processing device 102 via the communication interface 154. The transmit control module 132 is configured to adjust the values stored in the counters 180 and 182 based on flow control information provided by the packet flow control module 130 via the LINK2 bus. Buffer release packets containing credits associated with each link virtual channel are generated by the packet flow control module 130 and sent across the link to the transmit control module 132. The credits are used to increment the counters 180 and 182, which indicate how many packets may be sent from device interface 145 to device interface 140 in each link virtual channel. A packet may be sent in a particular link virtual channel only if the counter associated with that channel is nonzero, and the counter is decremented when the packet is sent. This may be better understood with reference to FIG. 2.

FIG. 2 is a diagram of a particular embodiment of a table 200 illustrating a flow control scheme for a particular link virtual channel of the data processing system 100 of FIG. 1. Table 200 includes a column 202, indicating an action that takes place at the data processing device 104. Column 204 indicates the amount of space available for pointers at the FIFO 112, while column 206 indicates the amount of space available for pointers at the FIFO 114. The numbers in the columns 204 and 206 indicate the number of pointers that can be stored at the associated FIFO. Accordingly, at row 220, the number 5 in column 204 indicates that there is space available at the pointer FIFO 112 for 5 pointers to be stored and the number 2 at column 206 indicates there is space available for 2 pointers at the pointer FIFO 114.

Column 208 indicates the amount of space available at the packet buffer 110 to store received packets. The values in column 208 represent the number of packets associated with the link virtual channel that the packet buffer 110 has space available to store. Accordingly, the number 5 in column 208 at row 220 indicates that the packet buffer 110 has space available for 5 additional packets.

The column 210 indicates the value stored at the counter 180, and represents the maximum amount of space that is available between the pointer FIFO 112, the pointer FIFO 114, and the packet buffer 110, which is based on the minimum of the space available at each, but with some delay in incrementing due to the time required to receive flow control packets from the other device. In the illustrated example of FIG. 2, as long as the number in column 210 is greater than one, the transmit control module 132 can transmit packets associated with the link virtual channel 160 from the packet buffer 134 to the data processing device 102. By basing the value stored at the counter 180 on the minimum amount of space available between the packet buffer 110 and the pointer FIFOs 112 and 114, the transmission control module 132 ensures that a packet transmission for the link virtual channel 160 does not result in an overflow condition at the data processing device 102.

To illustrate, in the depicted example of FIG. 2 the data processing system 100 is reset at row 220. In response, the packet flow control module 130 determines that the pointer FIFO 112 has 5 available locations, pointer FIFO 114 has 2 available locations, and packet buffer 110 has 5 available locations for the virtual channel 160. Further, the number of available credits is set to zero. At row 221, the packet flow control module 130 sends buffer release credits to the transmit control module 132 to increment the value stored at the counter 180, which is associated with the virtual channel 160, to the minimum number of available locations, i.e. the number 2.

At row 222, the data processing device 104 determines, based on the value stored in the counter 180, that there is a nonzero credit balance associated with a link virtual channel. Accordingly, the data processing device 104 sends a transaction layer packet associated with that link virtual channel to the data processing device 102, and decrements the counter 180 to 1. The device interface 140 receives the packet, and determines that it is a packet of a first type, referred to in the depicted example as an LP packet, associated with the link virtual channel 160. The receive control module 119 determines that pointers associated with LP packets are associated with an internal virtual channel associated with the pointer FIFO 112. Accordingly, the number of available locations at the pointer FIFO 112 and the packet buffer 110 are each reduced by one.

At row 223, the flow control module 130 determines that there has been no change in the minimum amount of space available for the virtual channel 160 since the minimum is still 2, and therefore issues a credit release packet, which is communicated to the device interface 145. In response to the received credit release packet, the transmit control module 132 increments the value stored at the counter 180 so that its stored value returns to two.

At row 224, another LP packet for the virtual channel 160 is transmitted by the data processing device 104, which accordingly decrements the stored value at counter 180 by one. The packet is received by the device interface 140. Accordingly the number of available locations at the pointer FIFO 112 and the packet buffer 110 is reduced by one. At row 225 the flow control module 130 determines the minimum number of slots available for the virtual channel 160 has not changed, and therefore issues a credit release packet. The packet is communicated to the device interface 145, which increments the number of available credits (stored at the counter 180) by one.

At row 226, the I/O control module 165 retrieves an LP packet associated with the link virtual channel 160 and internal virtual channel 112 from the packet buffer 110. Accordingly, the number of available locations at the packet buffer 110 and the pointer FIFO 112 is increased by one. This does not change the minimum number of available locations for the virtual channel 160, and the flow control module 130 therefore does not issue flow control packets to adjust the value stored at the counter 180.

At row 228, the data processing device 104 transmits a packet associated with the virtual channel 160 and decrements the number of available credits by one. The packet is received at the device interface 140, which determines that the packet is of a type, referred to in the depicted example as an HP packet, that is associated with an internal virtual channel associated with the pointer FIFO 114. Accordingly, the received packet is stored at the packet buffer 110 and a pointer to the buffer location stored at pointer FIFO 114. Accordingly, the number of available locations at the pointer FIFO 114 and the RAM 208 are each reduced by one. The flow control module 130 determines that the minimum number of available locations associated with the virtual channel has been reduced by one location. Accordingly, the flow control module 130 does not send a credit release packet to the device interface 145, and the number of available credits stored at the counter 180 remains at one.

At row 230, the data processing device 104 transmits another HP packet and decrements the number of available credits for the link virtual channel by one. The packet is received at the device interface 140, stored at the buffer 118, and a pointer to the buffer location of the stored packet is stored at the pointer FIFO 114. As illustrated in column 206, this results in the pointer FIFO 114 becoming full. The flow control module 130 determines that the minimum number of available locations associated with the virtual channel has been reduced by one location and therefore does not send a credit release packet to the device interface 145. In addition, while the number of available credits stored in counter 180 remains at zero, the transmit control module 132 prevents packets associated with the link virtual channel 160 from being transmitted to the data processing device 102. This prevents a possible overflow at the pointer FIFO 114.

At row 232, the I/O control module retrieves an HP packet from the packet buffer 110 based on a pointer obtained from the pointer FIFO 114. In response, the flow control module 130 determines the minimum number of available locations associated with the virtual channel 160 has increased by one, and, at row 233, sends a credit release packet to the device interface 145. In response, the transmit control module 132 adjusts the value stored at the counter 180 accordingly. The transmit control module 132 determines that the stored value is greater than zero, and resumes transmission of packets associated with the virtual channel 160.

Figure 3:
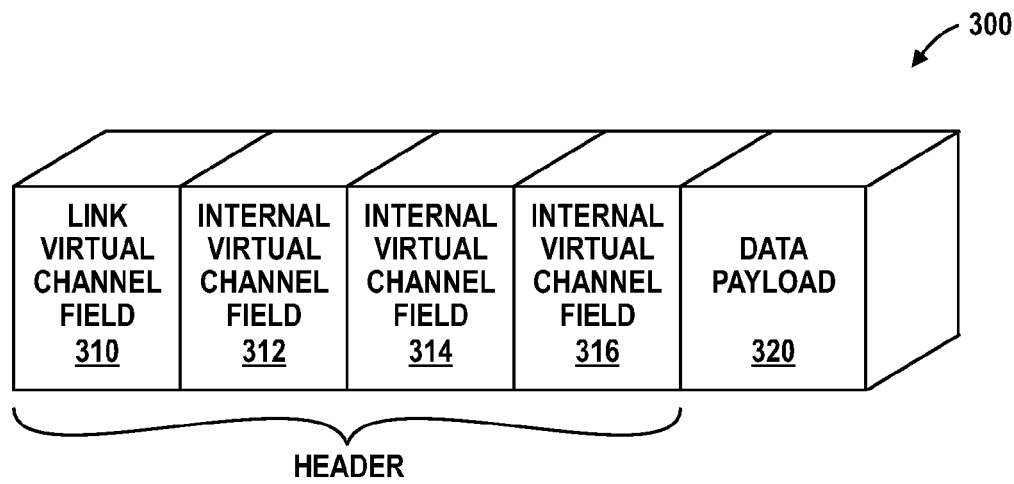
FIG. 3 is a block diagram of a particular embodiment of a data packet that can be communicated at the data processing device of FIG. 1.

Referring to FIG. 3, a particular embodiment of a packet 300 that can be stored at the packet buffer 110 of FIG. 1 is illustrated. The packet 300 includes a header 302 and a data payload 320. The header 302 includes a link virtual channel field 310 and fields 312, 314, and 316, referred to as internal virtual channel fields, that can provide information about the internal virtual channel associated with the packet 300. In an embodiment, the internal virtual channel fields 312, 314, and 316 are not dedicated fields to identify the internal virtual channel, but instead are fields identifying other packet attributes that can by analyzed by the receive control module 119 to determine the internal virtual channel associated with the packet 300.

The link virtual channel field 310 identifies the virtual channel associated with the transaction layer packet 300. Accordingly, the receive control module 119 (FIG. 1) can use the virtual channel field to identify whether a pointer associated with the packet 300 should be stored at the FIFO 116 or one of the pointer FIFOs 112 and 114. The receive control module 119 can use the internal virtual channel fields 312, 314, and 316, or the link virtual channel field 310, to identify which of the pointer FIFOs 112 and 114 should store a pointer associated with the packet 300 when the link virtual channel field indicates the packet is associated with link virtual channel 160.

Figure 4:
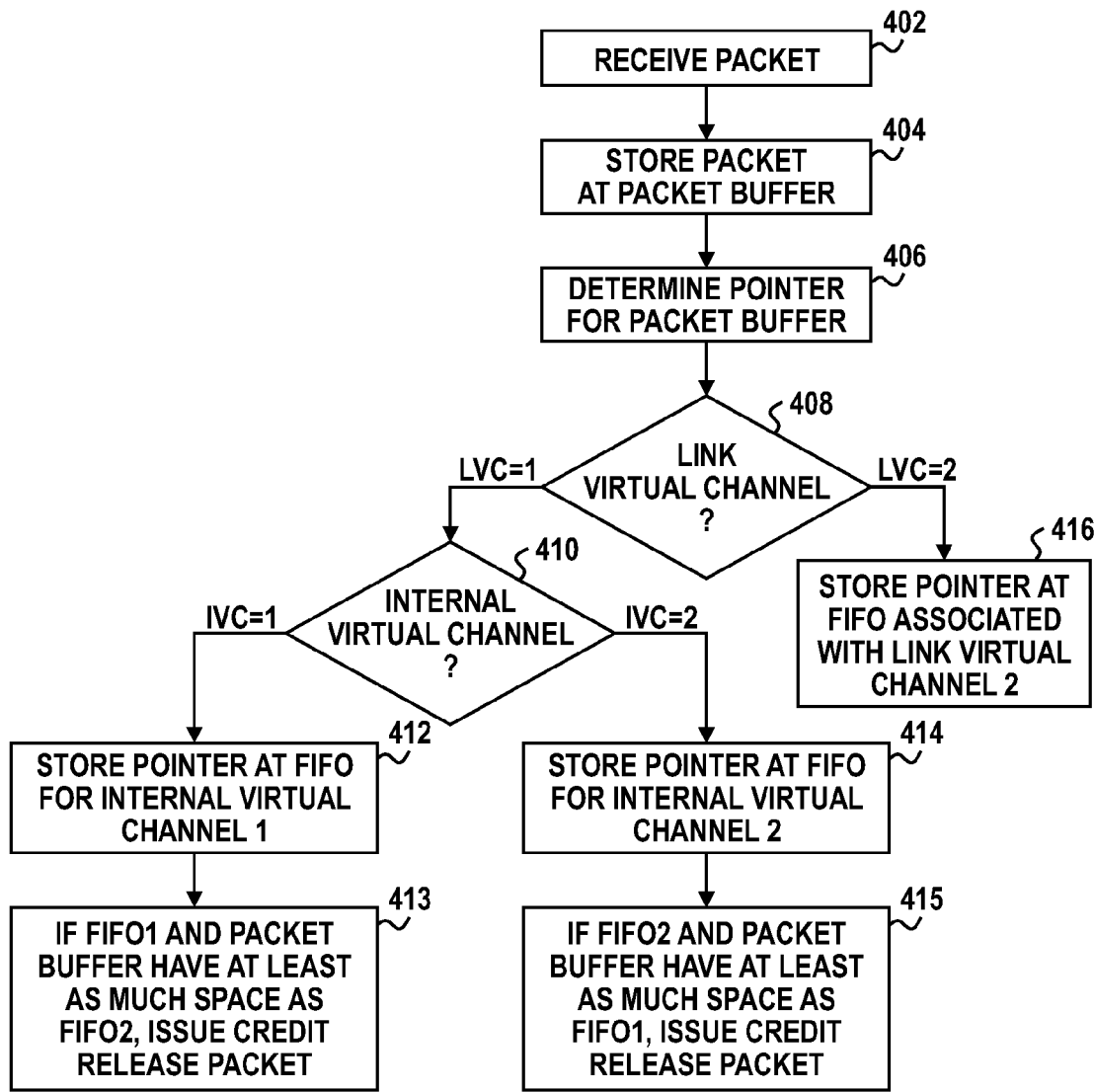
FIG. 4 is a flow diagram of a particular embodiment of a method of receiving packets at a data processing device in accordance with one aspect of the present disclosure.

Referring to FIG. 4, a flow diagram of a particular embodiment of a method of receiving packets at a data processing device is illustrated. At block 402, a packet is received via a physical communications link associated with a plurality of virtual channels. At block 404, the packet is stored at a packet buffer of the data processing device. Moving to block 406, a pointer associated with the location of the packet buffer for the packet is determined. At block 408, it is determined whether the packet is associated with a first link virtual channel. If not, the method flow proceeds to block 416 and the pointer is stored at a FIFO associated with a second link virtual channel.

Returning to block 408, if the received packet is associated with the first link virtual channel the method flow proceeds to block 410, and it is determined whether the received packet is associated with a first internal virtual channel. In an embodiment, the determination of whether an internal virtual channel is associated with a particular internal virtual channel is based on a class of service associated with the packet and a class of service associated with the internal virtual channel. If it is determined that the received packet is associated with the first internal virtual channel, the method flow moves to block 412 and the pointer is stored at a FIFO (labeled FIFO1) associated with the first internal virtual channel. At block 413, it is determined whether the amount of available space to store packets at FIFO1 is at least as much as the amount of space available to store packets at the packet buffer, and at least as much as the amount of space available to store packets at another FIFO (labeled FIFO2) associated with a second internal virtual channel. If so, a credit release packet is issued to indicate to the packet transmitting device that space is available for additional packets.

If, at block 410, it is determined that the received packet is not associated with the first data type the method flow proceeds to block 414 and the pointer is stored at FIFO2, (i.e. the FIFO associated with a second internal virtual channel). Accordingly, pointers to memory locations storing packets associated with the first virtual channel can be stored in different FIFOs depending on the internal virtual channel associated with a link virtual channel. This allows received data targeted for a typical application to be differentiated based on the type of data, priority of data, or other criteria, without increasing the number of virtual channels associated with the physical communications link. At block 415, it is determined whether the amount of available space to store packets at FIFO2 is at least as much as the amount of available space to store packets at the packet buffer, and at least as the amount of space available to store packets FIFO1 associated with a second internal virtual channel. If so, a credit release packet is issued to indicate to the packet transmitting device that space is available for additional packets to be transmitted.

Figure 5:
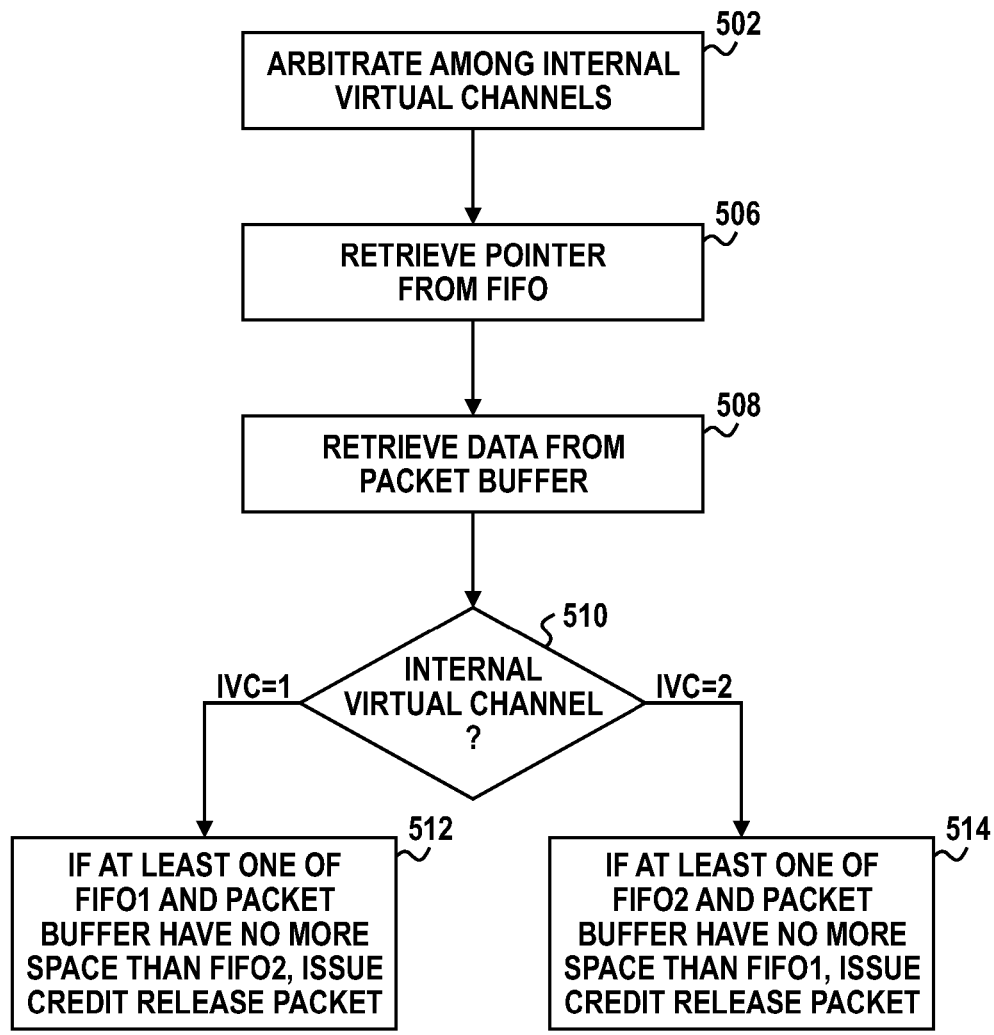
FIG. 5 is a flow diagram of a particular embodiment of a method of managing communication flows at a data processing device in accordance with one aspect of the present disclosure.

Referring to FIG. 5, a flow diagram of a particular embodiment of a method of managing communication flows at a data processing device is illustrated. At block 502, arbitration is conducted to select one of a plurality FIFOs (labeled FIFO1 and FIFO2), where each FIFO is associated with an internal virtual channel of a device interface. In the illustrated embodiment, FIFO1 is associated with internal virtual channel 1, while FIFO2 is associated with internal virtual channel 2. The arbitration at block 502 can be based upon a number of criteria, including priority of data types, device resource availability, and the like.

At block 506, a pointer is retrieved from the selected FIFO. Proceeding to block 508, the pointer is used to retrieve a packet from a packet buffer. This frees one location each in the FIFO and the packet buffer. The retrieved packet is forwarded from the device interface to another module of the data processing device. At block 510, it is determined which internal virtual channel is associated with the retrieved packet. If the retrieved packet is associated with virtual channel 1, the method flow moves to block 512 and if at least one of FIFO1 and the space in the packet buffer allotted to the virtual channel have not more space than FIFO2, a credit release packet is issued. If, at block 510, it is determined that the retrieved packet is associated with virtual channel 2, the method flow moves to block 514 and if at least one of FIFO2 and the space in the packet buffer allotted to the virtual channel have not more space than FIFO1, a credit release packet is issued. This allows the data processing device to keep track of available space at the first data processing device associated with the virtual channel. The second data processing device can manage transmission of packets to the first device accordingly.

Other embodiments, uses, and advantages of the disclosure will be apparent to those skilled in the art from consideration of the specification and practice of the disclosure disclosed herein. It will further be appreciated that, although some circuit elements and modules are depicted and described as connected to other circuit elements, the illustrated elements may also be coupled via additional circuit elements, such as resistors, capacitors, transistors, and the like. The specification and drawings should be considered exemplary only, and the scope of the disclosure is accordingly intended to be limited only by the following claims and equivalents thereof.

What is claimed is:

1. A method, comprising:
   receiving a first packet at a physical communication link;
   determining, based upon first header information of the first packet, that the first packet is associated with a first virtual channel of a plurality of virtual channels associated with the physical communication link;
   storing information associated with the first packet at a first storage location of a memory;
   storing a first pointer at a first FIFO associated with the first virtual channel in response to determining information of the first packet meets a first criteria, wherein the first pointer is based upon the first storage location; and
   storing the first pointer at a second FIFO associated with the first virtual channel in response to determining the information of the first packet meets a second criteria;
   determining an amount of available space associated with the first FIFO and the second FIFO, wherein determining the amount of available space associated with the first FIFO and the second FIFO comprises:
     determining a first amount of available space associated with the first FIFO;
     determining a second amount of available space associated with the second FIFO;
     determining a minimum of the first amount of available space and the second amount of available space; and
     determining the amount of available space associated with the first FIFO and the second FIFO based on the minimum of the first amount of available space associated with the first FIFO and the second amount of available space associated with second FIFO; and
   sending an availability indicator associated with the first virtual channel based on the amount of available space associated with the first FIFO and the second FIFO.

2. The method of claim 1, further comprising:
   adjusting the first amount of available space in response to storing the first pointer.

3. The method of claim 1, wherein determining the amount of available space associated with the first FIFO and the second FIFO further comprising:
   determining a third amount of available space associated with memory; and
   sending the availability indicator associated with the first virtual channel based on the first amount of available space associated with the first FIFO, the second amount of available space associated with the second FIFO and the third amount of available space associated with the memory.

4. The method of claim 3, wherein determining the amount of available space associated with the first FIFO and the second FIFO comprises:
   determining a minimum of the first amount of available space associated with the first FIFO, the second amount of available space associated with the second FIFO, and the third amount of available space associated with the memory; and
   determining the amount of available space associated with the first FIFO and the second FIFO based on the minimum of the first amount of available space associated with the first FIFO, the second amount of available space associated with the second FIFO, and the third amount of available space associated with the memory.

5. The method of claim 1, further comprising:
receiving a second packet at the physical communication link;
determining, based upon header information of the second packet, that the second packet is associated with a second virtual channel;
storing information associated with the second packet at a second storage location; and
storing a third pointer at a third FIFO dedicated to the second virtual channel in response to receiving the second packet.

6. The method of claim 1, wherein the first header information comprises a virtual channel field indicating the first virtual channel.

7. The method of claim 1, wherein the first header information comprises a plurality of fields.

8. The method of claim 1, wherein the information of the first packet is based upon payload information of the first packet.

9. The method of claim 1, wherein the information of the first packet indicates a class of service associated with the first packet.

10. A method, comprising:
receiving a first packet at a physical communication link;
determining that the first packet is associated with a first virtual channel of a plurality of virtual channels;
storing information associated with the first packet at a memory location;
storing a first pointer at a first FIFO associated with the first virtual channel in response to determining the first packet is associated with a first class of service, wherein the first pointer is based upon the memory location; and
storing the first pointer at a second FIFO associated with the first virtual channel in response to determining the first packet is associated with a second class of service;
determining an amount of available space associated with the first FIFO and the second FIFO, wherein determining the amount of available space associated with the first FIFO and the second FIFO comprises:
determining a first amount of available space associated with the first FIFO;
determining a second amount of available space associated with the second FIFO; and
determining the amount of available space associated with the first FIFO and the second FIFO based on a minimum of the first amount of available space associated with the first FIFO and the second amount of available space associated with the second FIFO; and
controlling transmission of packets via the physical communication link based on the amount of available space associated with the first FIFO and the second FIFO.

11. The method of claim 10, wherein determining the amount of available space based on the minimum of the first amount of available space associated with the first FIFO and the second amount of available space associated with the second FIFO comprises:

determining a third amount of available space associated with memory;
determining the amount of available space based on a minimum of the first amount of available space associated with the first FIFO, the second amount of available space associated with the second FIFO, and the third amount of available space associated with the memory.

12. A device, comprising:
a communication interface comprising an input configured to receive a packet via a physical communication link associated with a plurality of virtual channels and an output;
a memory coupled to the communication interface, the memory configured to store the packet;
a receive control module coupled to the communication interface, the receive control module configured to determine, based upon first header information of the packet, that the packet is associated with a first virtual channel of the plurality of virtual channels;
a first FIFO coupled to the receive control module, the first FIFO configured to store a first pointer in response to second header information of the packet meeting a first criteria and to not store the first pointer in response to the second header information of the packet not meeting the first criteria, wherein the first pointer is based upon first storage location; and
a second FIFO, the second FIFO configured to store the first pointer in response to the second header information of the packet meeting the second criteria and to not store the first pointer in response to the second header information of the packet not meeting the first criteria;
a flow control module coupled to a data bus, the flow control module configured to determine an amount of available space associated with the first FIFO and the second FIFO, wherein the flow control module is configured to:
determine a first amount of available space associated with the first FIFO;
determine a second amount of available space associated with the second FIFO;
determine a minimum of the first amount of available space associated with the first FIFO and the second amount of available space associated with the second FIFO; and
determine the amount of available space based on the minimum of the first amount of available space associated with the first FIFO and the second amount of available space associated with the second FIFO, and to send an availability indicator based on the amount of available space associated with the first and the second FIFO.

13. The device of claim 12, wherein the flow control module is further configured to determine a third amount of available space associated with memory, and to send the availability indicator based on the first amount of available space associated with the first FIFO, the second amount of available space associated with the second FIFO and the third amount of available space associated with the memory.

* * * * *